(12) United States Patent
Grieve et al.

(10) Patent No.: US 7,487,344 B2
(45) Date of Patent: Feb. 3, 2009

(54) IMPLEMENTING A MICROPROCESSOR BOOT CONFIGURATION PROM WITHIN AN FPGA

(75) Inventors: Richard Grieve, Ottawa (CA); Aaron Maxwell MacDonald, Ottawa (CA); James Michael Schriel, Kanata (CA)

(73) Assignee: Alcatel Lucent, Paris (FR)

( * ) Notice: Subject to any disclaimer, the term of this patent is extended or adjusted under 35 U.S.C. 154(b) by 391 days.

(21) Appl. No.: 11/366,661

(22) Filed: Mar. 3, 2006

(65) Prior Publication Data

US 2007/0208926 A1    Sep. 6, 2007

(51) Int. Cl.
*G06F 7/60* (2006.01)
(52) U.S. Cl. .................. 713/2; 713/1; 703/14; 703/21; 703/23; 703/24; 703/28
(58) Field of Classification Search ...... 713/1, 713/2; 703/14, 21, 23, 24, 28
See application file for complete search history.

(56) References Cited

U.S. PATENT DOCUMENTS

| 7,265,578 B1 * | 9/2007 | Tang et al. ................. 326/40 |
| 7,287,154 B1 * | 10/2007 | Puckette ........................ 713/1 |
| 2004/0093488 A1 * | 5/2004 | Horanzy ........................ 713/1 |

* cited by examiner

*Primary Examiner*—Abdelmoniem Elamin

(57) ABSTRACT

A method and apparatus are provided for storing the boot configuration PROM of a microprocessor in an FPGA. The boot interface of the microprocessor, such as an I2C interface, leads to the FPGA instead of to a PROM. The boot configuration is stored as an image in the FPGA, and the microprocessor accesses the boot configuration using its normal boot interface. In this way, a dedicated boot PROM is not needed, saving real estate on the card on which the microprocessor is located. The boot configuration is also more easily modified, such as for version upgrades or diagnostics, than if the boot configuration were stored on a dedicated PROM. Different boot configurations may be stored as software images on a separate housekeeper processor, for loading into the FPGA.

12 Claims, 1 Drawing Sheet

IMPLEMENTING A MICROPROCESSOR BOOT CONFIGURATION PROM WITHIN AN FPGA

FIELD OF THE INVENTION

The invention relates to boot configuration of microprocessors, and more particularly to the manner in which the boot configuration data is stored and accessed.

BACKGROUND OF THE INVENTION

When a microprocessor boots, it accesses a boot configuration in order to retrieve configuration values. This is done through a boot interface on the microprocessor. One of the most common boot interfaces is an I2C interface. For a microprocessor supporting an I2C interface, the boot interface accesses two pins leading from the microprocessor. The microprocessor may support other interfaces, in which a different number of dedicated pins are used, or in which a bus and address are used.

Typically, the boot configuration is stored in a PROM, and the two pins through which the I2C interface communicates lead to the PROM. The PROM is a dedicated device within a socket on the same board (or card) as the microprocessor. If the boot configuration is to be reconfigured, the PROM can be removed from the socket and reprogrammed in a reprogramming station. Field management of such PROMs is extremely difficult, as the reprogramming stations are usually at a central location.

Some PROMs are in-circuit reconfigurable. Such PROMs need not be removed from their socket in order to be reprogrammed. Reprogramming is often done by a field technician through a physical connector on the board that leads the PROM. The physical connector and its connections leading to the PROM occupy real estate on the board.

Some in-circuit reconfigurable PROMs can be accessed by other processors for reconfiguration. While this removes the need for a separate physical connector, additional signaling to and from the PROM must be used. And in any event, the dedicated PROM and socket still occupy real estate on the board.

SUMMARY OF THE INVENTION

In accordance with one aspect of the invention, a card is provided which includes a field programmable device and a microprocessor having bootstrap pins leading to the field programmable device. The field programmable device is preferably an FPGA emulating an I2C PROM including a boot configuration accessed by the microprocessor through an I2C interface.

In accordance with another aspect of the invention, a system is provided for providing a boot configuration to a microprocessor. A slave card and a housekeeper processor. The slave card includes a field programmable device and the microprocessor, the microprocessor having bootstrap pins leading to the field programmable device. A housekeeper processor stores a software image for communicating a boot configuration to the field programmable device. The field programmable device is preferably an FPGA, and the housekeeper processor communicates the boot configuration to the FPGA as part of an FPGA configuration bitstream for emulating an I2C PROM.

In accordance with yet another aspect of the invention, a method is provided for providing a boot configuration to a microprocessor. The boot configuration is downloaded into an FPGA via an FPGA bitstream, and the microprocessor accesses the boot configuration from the FPGA. Preferably, the boot configuration is loaded into the FPGA from a housekeeper processor as part of a bitstream for emulating an I2C PROM.

The methods and apparatus of the present invention allow straightforward reconfiguration of a boot configuration. A boot configuration and bootstrap interface are stored as a software image which can be loaded into a housekeeper processor. The software image can then be used to send a bitstream to an FPGA, instructing the FPGA how to construct an emulation of the bootstrap interface and how to store the boot configuration. Different or new versions of the boot configuration, such as upgrade versions or diagnostic versions, can be loaded into the housekeeper processor, and the boot configuration stored in the FPGA can then be easily reconfigured. The use of an FPGA rather than a dedicated PROM and socket may also save real estate on the card on which the microprocessor is located.

BRIEF DESCRIPTION OF THE DRAWINGS

The features and advantages of the invention will become more apparent from the following detailed description of the preferred embodiment(s) with reference to the attached figures, wherein.

Figure 1:
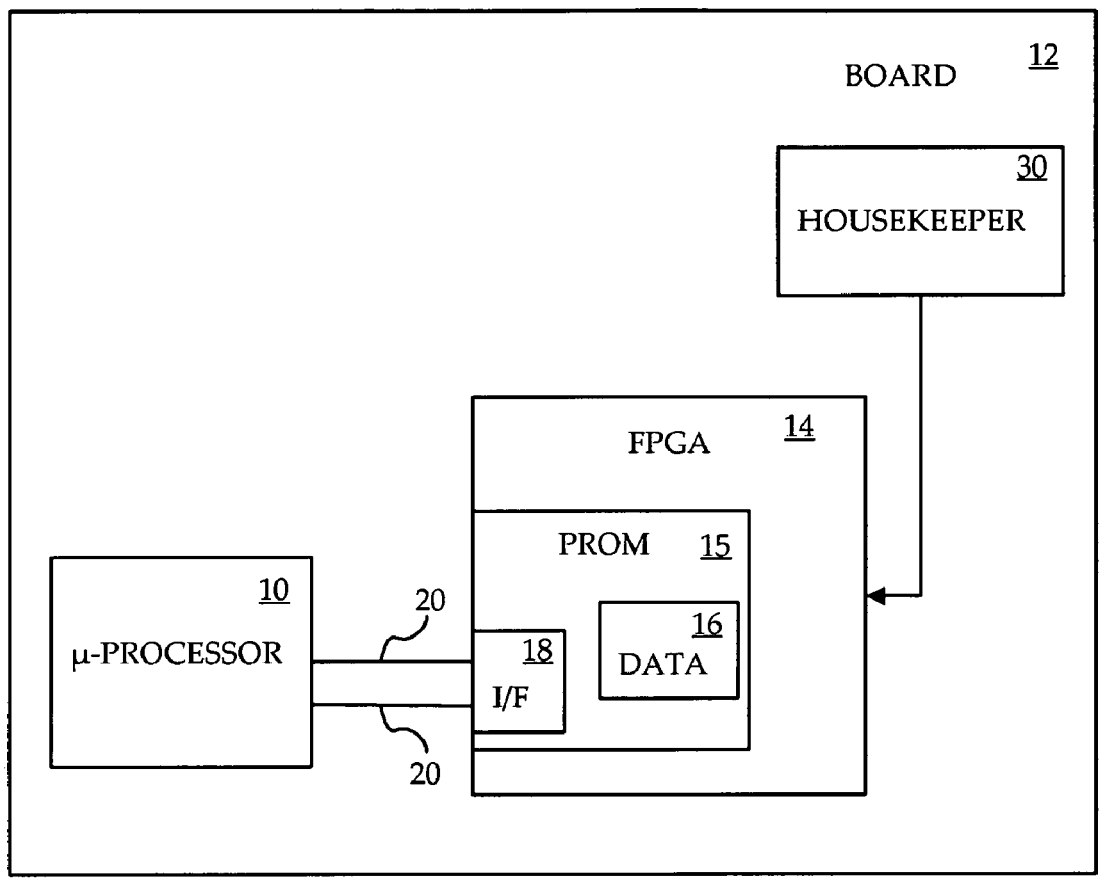
FIG. 1 is a diagram of a chip arrangement according to one embodiment of the invention.

It will be noted that in the attached figures, like features bear similar labels.

DETAILED DESCRIPTION OF THE EMBODIMENTS

Referring to FIG. 1, a chip arrangement according to one embodiment of the invention is shown. A microprocessor 10 is located on a circuit board 12, such as a card in a telecommunication device. The board 12 also includes a Field Programmable Gate Array (FPGA) 14. The FPGA includes an emulation of an I2C PROM 15. The I2C PROM emulation 15 includes an emulation of an I2C interface 18, logic carried out by a boot PROM, and boot configuration data 16. It should be noted that these are functional elements and may not necessarily be distinct elements, the I2C PROM being emulated as a whole. The microprocessor 10 includes an I2C interface (not shown) which communicates over two pins 20. The two pins 20 are the pins through which the microprocessor 10 retrieves a boot configuration when the microprocessor is booted. The two pins 20 lead to the I2C interface 18 on the FPGA 14. In this way, the microprocessor 10 retrieves its boot configuration from the boot configuration data 16 stored in the FPGA 14.

The board 12 also includes a housekeeper microprocessor 30. The housekeeper 30 communicates with the FPGA 14 through a JTAG (not shown). The housekeeper 30 maintains at least one software image of an FPGA emulation of an I2C PROM. When the FPGA is powered up, the housekeeper 30 supplies a bitstream to the FPGA 14, the bitstream being generated from the software image, indicating to the FPGA 14 how the FPGA 14 should set its logic blocks in order to emulate an I2C PROM including an initial boot configuration. This initial boot configuration loaded in the boot configuration data 16 is preferably a default boot configuration, the definition of which can be altered by altering the corresponding software image within the housekeeper 30. Thereafter, a different boot configuration can be sent from the housekeeper 30 to the FPGA 14, either as an FPGA bitstream defining the new boot configuration 16 or as part of a bitstream defining a new I2C PROM emulation, so that when the microprocessor 10 is next booted it will access the different boot configuration. This allows simple reconfiguration of the boot configuration, such as for upgrading the boot configuration or for supplying temporary boot configurations for use in diagnostics. The different boot configuration may also be included in a bitstream to the FPGA as part of a new version of other information, unrelated to boot configuration, within the FPGA. This allows versioning of boot configuration to be tied to versioning of other software.

The software image stored by the housekeeper 30 and used to generate the bitstream sent to the FPGA and instructing the FPGA how to emulate a boot configuration PROM may be stored on a separate computer-readable medium. The software image may then be generated separately, and loaded into the housekeeper 30 when needed.

The housekeeper processor 30 may be on a separate board from that of the microprocessor 10 and the FPGA 14. For example, the board 12 may be a slave card and the housekeeper processor 30 be located on a CPU controller card. In this embodiment, when the system (including both cards) is powered on, the housekeeper processor detects the presence of the slave card 12. The housekeeper processor determines the nature of the slave card, and transfers FPGA configuration data to the FPGA 14. The FPGA configuration data includes an emulation of a boot PROM. The housekeeper processor initiates boot configuration of the microprocessor 10 through the use of a control drive point within the FPGA 14, which controls the hard reset input of the microprocessor 10. The microprocessor 10 then attempts to configure itself through the I2C interface. In this way, it is guaranteed that the boot configuration is loaded into the FPGA before the microprocessor starts its configuration sequence.

The invention has been described using an FPGA to store an emulation of a boot configuration PROM. More generally, any field programmable device may be used to store the emulation of a boot configuration, such as a Complex Programmable Logic Device (CPLD). Advantages of the invention are realized if the field programmable device is used for other purposes in addition to storing boot configuration data, as his removes the need for a dedicated boot configuration device.

The invention has been described as using an I2C interface between the microprocessor 10 and the FPGA 14. More generally, the microprocessor may access its boot configuration through any form of interface. The emulation of the interface 18 within the FPGA 14 is an emulation of the slave interface corresponding to the interface used by the microprocessor 10 to access boot configuration. Emulation of other interfaces may of course use a different number of bootstrap pins leading from the microprocessor to the FPGA or CPLD.

The embodiments presented are exemplary only and persons skilled in the art would appreciate that variations to the embodiments described above may be made without departing from the spirit of the invention. The scope of the invention is solely defined by the appended claims.

We claim:

1. A circuit board comprising:
   a field programmable device;
   a first microprocessor having bootstrap pins through which the first microprocessor retrieves boot configuration data from the field programmable device; and
   a second microprocessor, coupled to the field programmable device, that initiates a boot configuration of the first microprocessor,
   wherein a definition of the boot configuration is altered by changing a software image stored within the second microprocessor.

2. The card of claim 1 wherein the field programmable device stores boot configuration data.

3. The card of claim 2 wherein the field programmable device is a Field Programmable Gate Array (FPGA).

4. The card of claim 3 wherein the FPGA stores boot configuration data as part of an I2C PROM emulation, and wherein the microprocessor accesses boot configuration data through an I2C interface.

5. The card of claim 4, wherein the second processor is a housekeeper processor that stores a software image of the I2C PROM emulation for loading into the FPGA via an FPGA bitstream.

6. The card of claim 2 wherein the field programmable device is a Complex Programmable Logic Device.

7. A system for boot configuration of a microprocessor, comprising:
   a slave card comprising:
      a field programmable device, and
      the microprocessor, the microprocessor having bootstrap pins through which the first microprocessor retrieves boot configuration data from the field programmable device; and
   a housekeeper processor storing a software image for communicating boot configuration data to the field programmable device,
      wherein the housekeeper processor initiates a boot configuration of the microprocessor and a definition of the boot configuration is altered by changing the software image stored within the housekeeper processor.

8. The system of claim 7 wherein the field programmable device is a Field Programmable Gate Array (FPGA), and wherein boot configuration data are communicated to the FPGA within an FPGA configuration bitstream.

9. The system of claim 8 wherein boot configuration data are communicated to the FPGA within an FPGA configuration bitstream for emulating an I2C PROM.

10. A method of boot configuration for a microprocessor, comprising:
    downloading boot configuration data into a Field Programmable Gate Array (FPGA) via an FPGA bitstream from a housekeeping processor; and
    downloading the boot configuration data from the FPGA through bootstrap pins into the microprocessor,
    wherein the housekeeper processor initiates a boot configuration of the microprocessor and a definition of the boot configuration is altered by changing the software image stored within the housekeeper processor.

11. The method of claim 10 wherein the microprocessor and the FPGA are located on a first card, and wherein downloading the boot configuration comprises downloading the boot configuration via an FPGA bitstream originating from a housekeeper processor located on a second card.

12. The method of claim 11 wherein downloading the boot configuration comprises downloading the boot configuration via an FPGA bitstream for emulating an I2C PROM.

* * * * *